US008834973B2

(12) United States Patent  
Bates et al.

(10) Patent No.: US 8,834,973 B2  
(45) Date of Patent: Sep. 16, 2014

(54) SUBSTRATE

(75) Inventors: Richard Alexander Bates, Ruthin (GB); Ovidiu Herlea, Bucharest (RO); Marc Moore-Smith, Stockport (GB)

(73) Assignee: Nautilus GB Limited, Arden House, Shepley Lane Industrial Estate, Hawk Green, Stockport (GB)

( * ) Notice: Subject to any disclaimer, the term of this patent is extended or adjusted under 35 U.S.C. 154(b) by 138 days.

(21) Appl. No.: 13/642,743

(22) PCT Filed: Apr. 20, 2011

(86) PCT No.: PCT/GB2011/000617  
§ 371 (c)(1), (2), (4) Date: Feb. 19, 2013

(87) PCT Pub. No.: WO2011/131940  
PCT Pub. Date: Oct. 27, 2011

(65) Prior Publication Data  
US 2013/0164462 A1 Jun. 27, 2013

(30) Foreign Application Priority Data  
Apr. 22, 2010 (GB) .................................. 1006744.5

(51) Int. Cl.  
B41F 1/00 (2006.01)  
B44F 1/00 (2006.01)  
B32B 3/30 (2006.01)  
B41M 3/14 (2006.01)  
B44F 5/00 (2006.01)  
B44F 1/08 (2006.01)  
B42D 15/00 (2006.01)  
B44F 1/10 (2006.01)

(52) U.S. Cl.  
CPC ... B44F 1/00 (2013.01); B32B 3/30 (2013.01); Y10S 428/916 (2013.01); B41M 3/148 (2013.01); B44F 5/00 (2013.01); B41M 3/14 (2013.01); B44F 1/08 (2013.01); B42D 15/0013 (2013.01); B42D 2031/14 (2013.01); B42D 2033/24 (2013.01); B42D 2035/20 (2013.01); B42D 2035/28 (2013.01); B44F 1/10 (2013.01); Y10S 428/916 (2013.01)  
USPC ............. 428/29; 428/107; 428/141; 428/167; 428/916

(58) Field of Classification Search  
CPC ................ B44F 1/00; B44F 5/00; B44F 1/08; B44F 1/10; B32B 3/30; B41M 3/148; B41M 3/14; B42D 2031/14; B42D 2033/24; B42D 2035/20; B42D 2035/28; B42D 15/0013; Y10S 428/916  
USPC ........................... 428/29, 107, 141, 167, 916  
See application file for complete search history.

(56) References Cited

U.S. PATENT DOCUMENTS 5,437,897 A * 8/1995 Tanaka et al. ................... 428/29  
2013/0164462 A1* 6/2013 Bates et al. ...................... 428/29

FOREIGN PATENT DOCUMENTS

| CA | 2496829 A1 | 3/2004 |
| CA | 2642330 A1 | 8/2007 |
| CA | 2694383 A1 | 1/2009 |
| DE | 102006016342 A1 | 10/2007 |
| EP | 0581414 A1 | 2/1994 |
| WO | 200220280 A1 | 3/2002 |

OTHER PUBLICATIONS

PCT International Search Report and Written Opinion (PCT/GB2011/000617), dated Aug. 24, 2011.  
UK Intellectual Property Office Search Report (GB1006744.5), dated Aug. 13, 2010.

* cited by examiner

*Primary Examiner* — Betelhem Shewareged  
(74) *Attorney, Agent, or Firm* — Bracewell & Giuliani LLP

(57) ABSTRACT

According to the present invention, there is provided a substrate comprising: a plurality of embossed grooves extending in a substantially parallel manner, there being a pitch for the spacing between the embossed grooves; a plurality of lines of deposited material provided in the vicinity of the embossed grooves, and extending in a substantially parallel manner, there being a pitch for the spacing between lines of deposited material, the deposited material having a different color to the substrate; in a background region of the substrate to be presented to a viewer of the substrate, there being a fixed positional relationship between the substantially parallel embossed grooves and the substantially parallel lines of deposited material, such that the region presents a first background to a viewer of the substrate when viewed from a first angle, and such that the region presents a second background to a viewer of the substrate when viewed from a second angle, the first and second angles being defined as angles on either side of a perpendicular to that substrate; and in an image region of the substrate to be presented to a viewer of the substrate, there being one or more deviations from the fixed positional relationship to provide a first image feature against the first background when viewed from the first angle, and a second image feature against the second background when viewed from the second angle, and wherein, if the one or more deviations are in the line or lines of deposited material, each of the one or more deviations is lesser in extent than the pitch of the embossed grooves, and for a majority of that region of the substrate; or if the one or more deviations are in the embossed groove or grooves, each of the one or more deviations is lesser in extent than the pitch of lines of deposited material for a majority of that region.

17 Claims, 8 Drawing Sheets

SUBSTRATE

Figure 1:
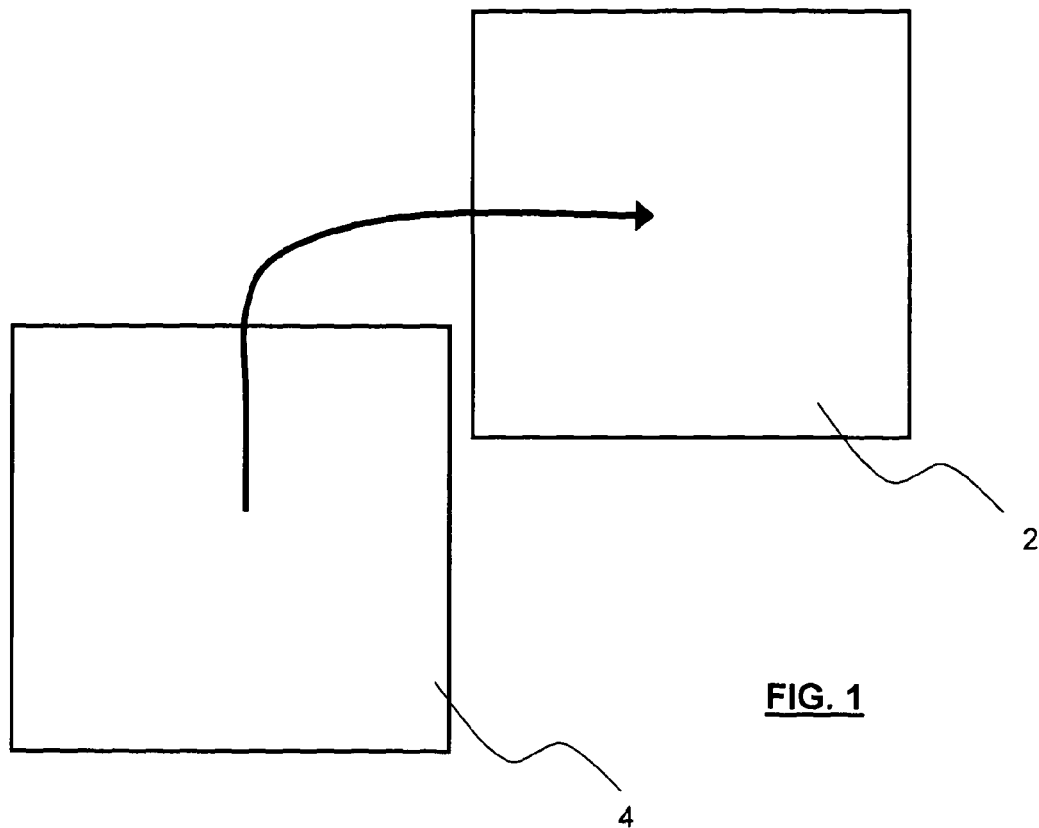

The present invention relates to a substrate, and in particular to a substrate provided with a plurality of embossed grooves and a plurality of lines of deposited material.

In the field of counterfeiting, it is known to use one or more hidden images which, when viewed, may prove the authenticity of the product. Hidden images may also be used in other fields, such as advertising, either to prove authenticity or an aesthetic effect.

A hidden image is a term used in the printing industry to describe a hidden pattern printed or otherwise provided on a substrate (e.g. paper, plastic or the like). The hidden image may comprise printed dots and/or lines that are printed in a manner that makes it difficult or impossible for the hidden image to be viewed by the naked human eye without use of a specific viewing tool—i.e. an optical decoder. The optical decoder is configured to render the hidden image visible, for example when overlaid over the hidden image. The optical decoder may, for instance, be an appropriately configured Fresnel lens-like arrangement.

Although the combined use of the hidden image and optical decoder may be successful in proving or disproving the authenticity of a product, there are disadvantages associated with such combined use. Because a separate independent optical decoder is required to view the hidden image, an inspector of the product provided with the hidden image must always be provided with such an optical decoder. This means that, for example, a vendor of the product must always provide the optical decoder, or the customer or the like must always carry around with them an optical decoder. If the optical decoder is lost, damaged or destroyed, it may not be possible to view the hidden image provided on the product, thus increasing the chances of a counterfeit product being sold. Furthermore, the need for a separate independent optical decoder may add to production and maintenance costs.

It is therefore an objective of the present invention to be able to provide at least some of the functionality of the printed hidden image and independent optical decoder arrangements that already exist, but without the need to provide a separate, independent optical decoder.

There have been attempts at overcoming the above-mentioned problems by providing such hidden images in a form that does not require the use of a separate independent optical decoder to view that image. In one such approach, a substrate is provided with a plurality of embossed grooves and a plurality of lines of deposited material. The grooves and lines of material are positioned relative to one another such that the hidden image only becomes visible, or more readily visible, when the substrate is viewed at an angle away from perpendicular to the substrate. However, the existing methods lack subtlety and refinement, with the result that the resultant image to be hidden also lacks subtly and refinement.

It is therefore an additional or alternative objective of the present invention to obviate or mitigate the problems associated with the use of combined embossing and material deposition, or at least to provide a viable alternative.

According to an aspect of the present invention, there is provided a substrate comprising: a plurality of embossed grooves extending in a substantially parallel manner, there being a pitch for the spacing between the embossed grooves; a plurality of lines of deposited material provided in the vicinity of the embossed grooves, and extending in a substantially parallel manner, there being a pitch for the spacing between lines of deposited material, the deposited material having a different colour to the substrate; in a background region of the substrate to be presented to a viewer of the substrate, there being a fixed positional relationship between the substantially parallel embossed grooves and the substantially parallel lines of deposited material, such that the region presents a first background to a viewer of the substrate when viewed from a first angle, and such that the region presents a second background to a viewer of the substrate when viewed from a second angle, the first and second angles being defined as angles on either side of a perpendicular to that substrate; and in an image region of the substrate to be presented to a viewer of the substrate, there being one or more deviations from the fixed positional relationship to provide a first image feature against the first background when viewed from the first angle, and a second image feature against the second background when viewed from the second angle, and wherein, if the one or more deviations are in the line or lines of deposited material, each of the one or more deviations is lesser in extent than the pitch of the embossed grooves, and for a majority of that region of the substrate; or if the one or more deviations are in the embossed groove or grooves, each of the one or more deviations is lesser in extent than the pitch of lines of deposited material for a majority of that region.

The fixed positional relationship between the substantially parallel embossed grooves and the substantially parallel lines of deposited material may be defined by the substantially parallel embossed grooves being substantially parallel to the substantially parallel lines of deposited material, and/or by the location of the substantially parallel embossed grooves being substantially in phase with the location of the substantially parallel lines of deposited material.

If the one or more deviations are in the line or lines of deposited material, each of the one or more deviations may be arranged such that, for a majority of the image region of the substrate, a line of deposited material does not clash with an adjacent line of deposited material.

If the one or more deviations are in the embossed groove or grooves, each of the one or more deviations may be arranged such that, for a majority of the image region of the substrate, an embossed groove does not clash with an adjacent embossed groove.

The deviation may vary in extent across the image region to provide a variation in tone for the image feature, or one or more image features, the deviation varying in extent along one or more embossed grooves or along one or more lines of deposited material, and/or between one or more embossed grooves or between one or more lines of deposited material.

A portion of the deposited material in the image region may be located within one or more embossed grooves, such that at least a portion of the image feature, or a composite image formed from a plurality of such image features, is hidden from view when viewed from one or more shallow angles (e.g. away from perpendicular).

Further deposited material may be provided on one or more relatively flat regions of the substrate located between adjacent grooves, the further deposited material across a plurality of such flat regions constituting a fixed image, that is substantially visible regardless of the viewing angle due to being located on those flat regions, the image feature constituting a variable image feature, the visibility of which varies with viewing angle, at least more substantially than the fixed image.

The variable image feature may be substantially hidden within the fixed image, when viewed substantially perpendicularly with respect to the substrate.

The further deposited material may have a different colour to: the deposited material, and/or the substrate.

At least a portion of the deposited material may be located on a curved region of the substrate within, or in the vicinity of, one or more embossed grooves.

The first background and the second background may be different with respect to one another by presenting one or more of: a different colour; a different tone; and/or a different contrast, and/or wherein the first image feature and/or second image feature may be visible against the first background and/or second background, respectively, by presenting one or more of: a different colour; a different tone; and/or a different contrast.

A plurality of deviations may be present to form a plurality of image features, the location and/or extent of the deviations being arranged such that the combination of the image features results in a composite image. The composite image may be one or more of, or a combination of: a character, a symbol, a number, a letter, a pattern and/or a picture.

One or more lines of deposited material may be a continuous line, or a broken line of discrete deposits, and/or one or more of the embossed grooves may be a continuous groove, or a broken line of discrete grooves. The line(s) or groove(s) may be straight, curved, wavy or the like, or a combination thereof.

The deposited material, and/or the further deposited material, and/or the substrate may be different in colour when viewed by a naked eye under ambient lighting conditions, and/or wherein the difference in colour may only be visible when the deposited material and/or the substrate is illuminated with light of a particular wavelength, optionally ultraviolet radiation.

The pitch of the embossed grooves, and/or the pitch of lines of deposited material, may be low enough for the pitch not to be readily perceivable by a naked eye of a viewer of the substrate (e.g. the pitch may be, or may be less than, one groove and/or line per millimeter).

The deposited material may be provided before the embossing. Alternatively, the deposited material may be provided after the embossing.

Figure 2:
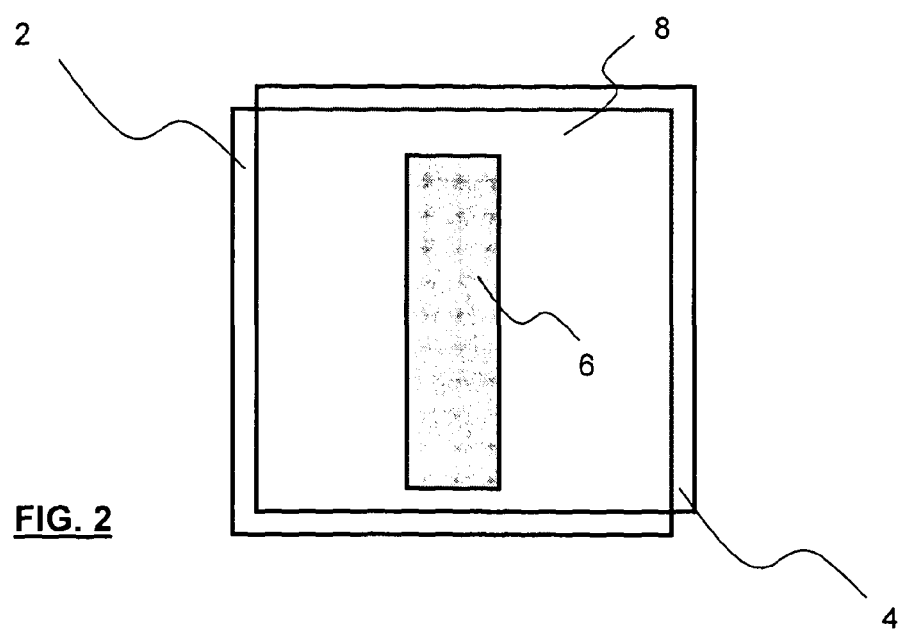
Figure 3:
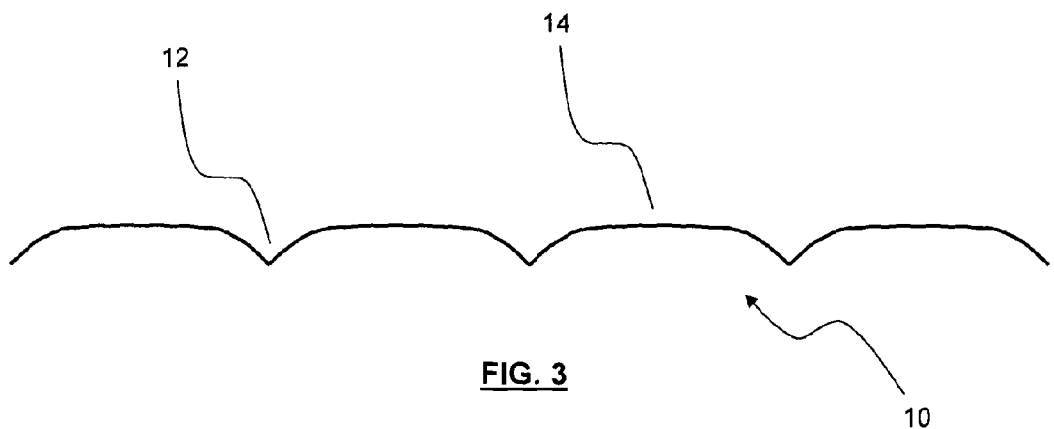
Figure 4:
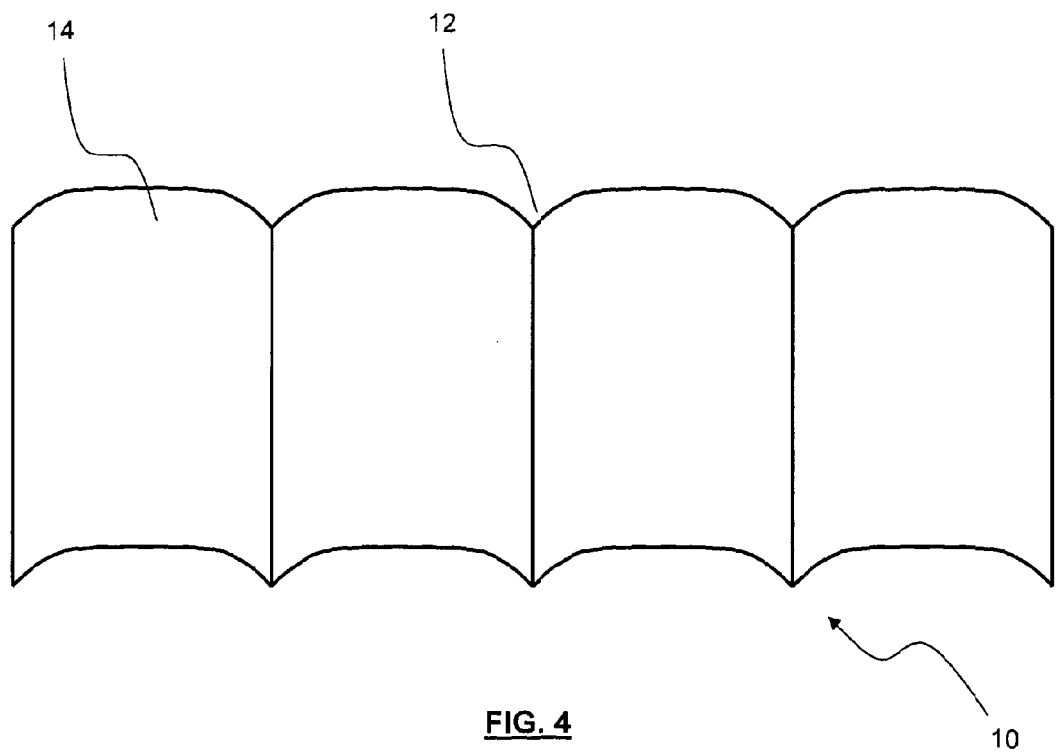
Figure 5:
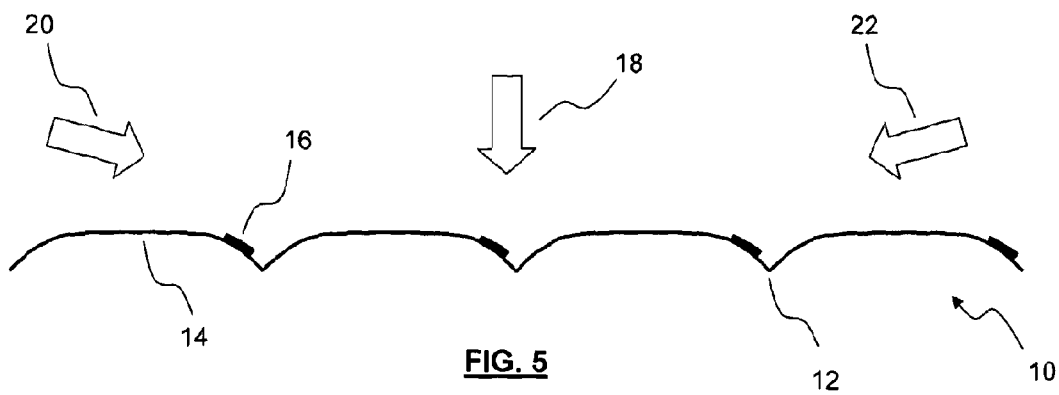
Figure 6:
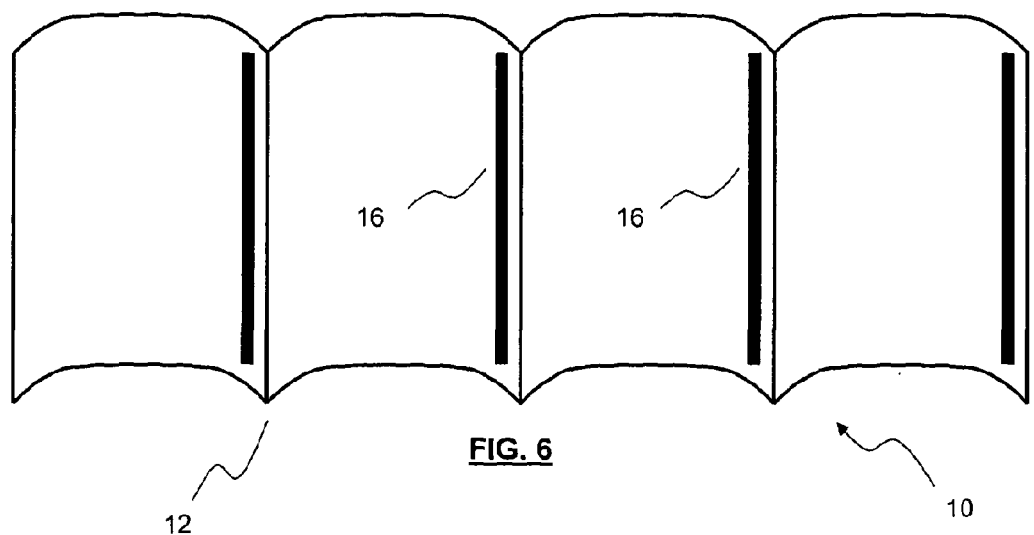
Figure 7:
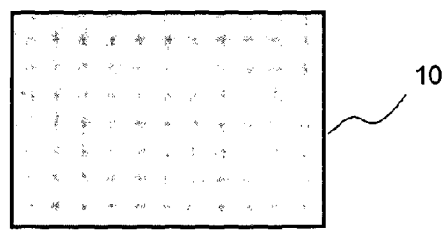
Figure 8:
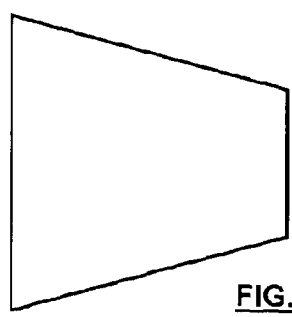
Figure 9:
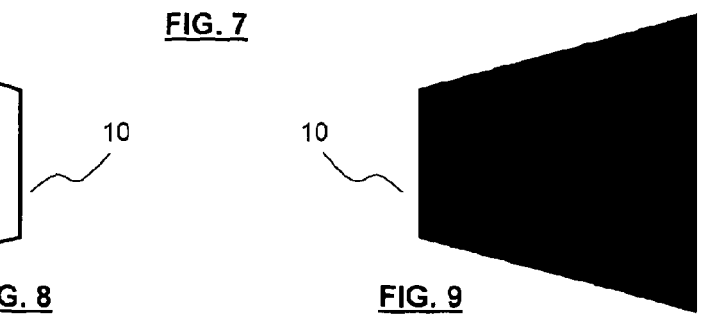
Figure 10:
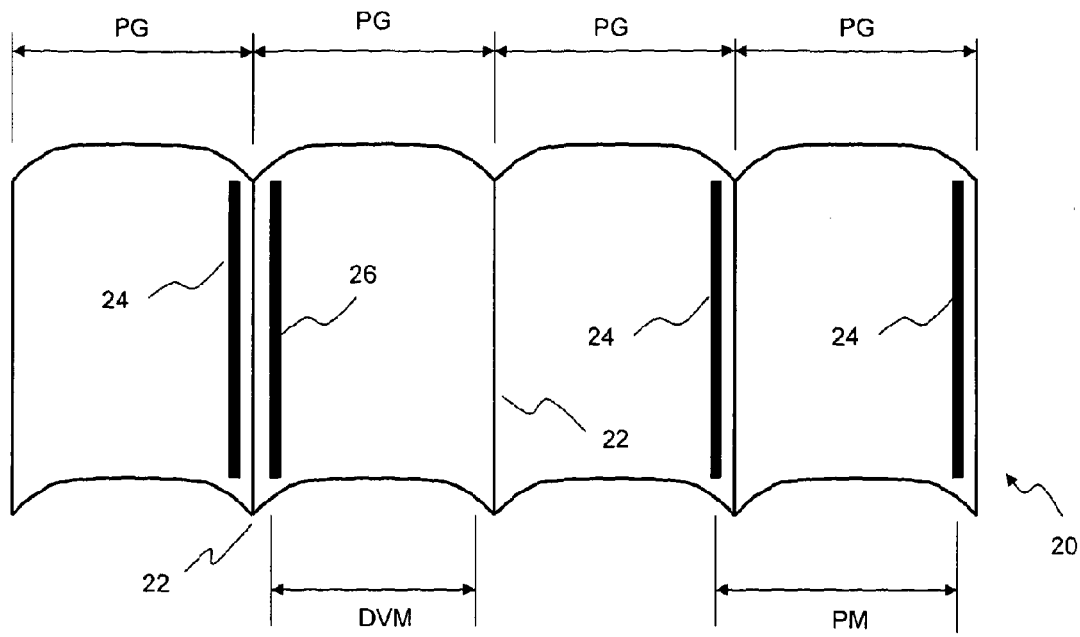
Figure 11:
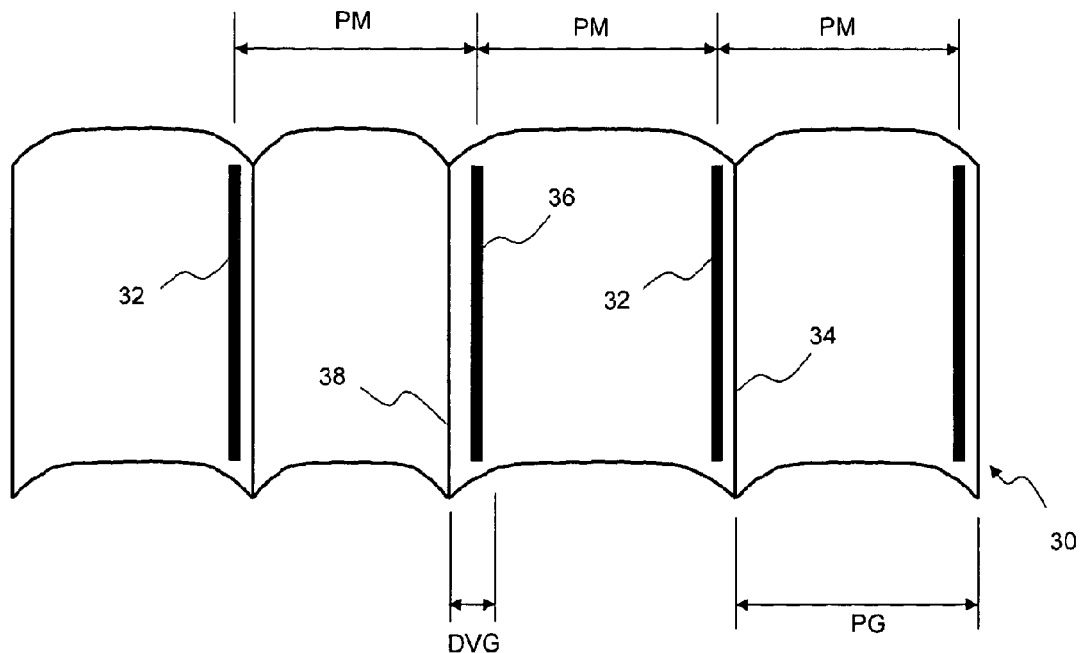
Figure 12:
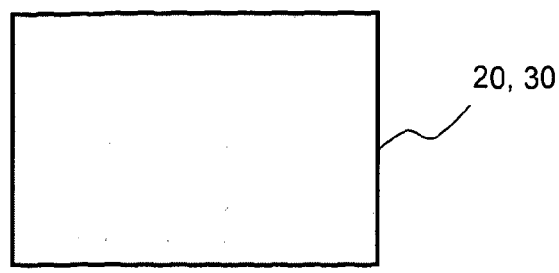
Figure 13:
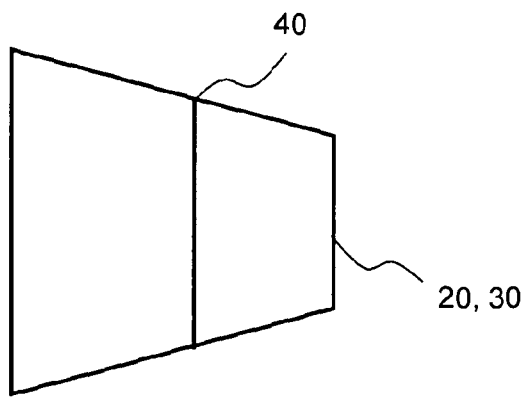
Figure 14:
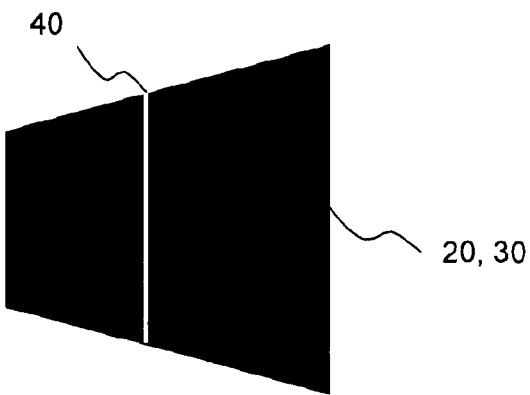
Figure 15:
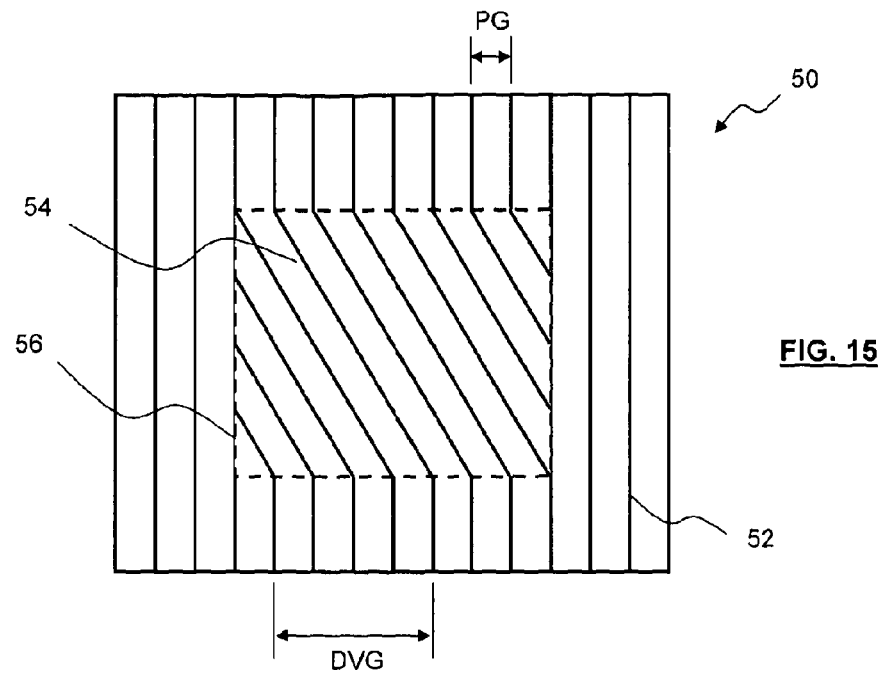
Figure 16:
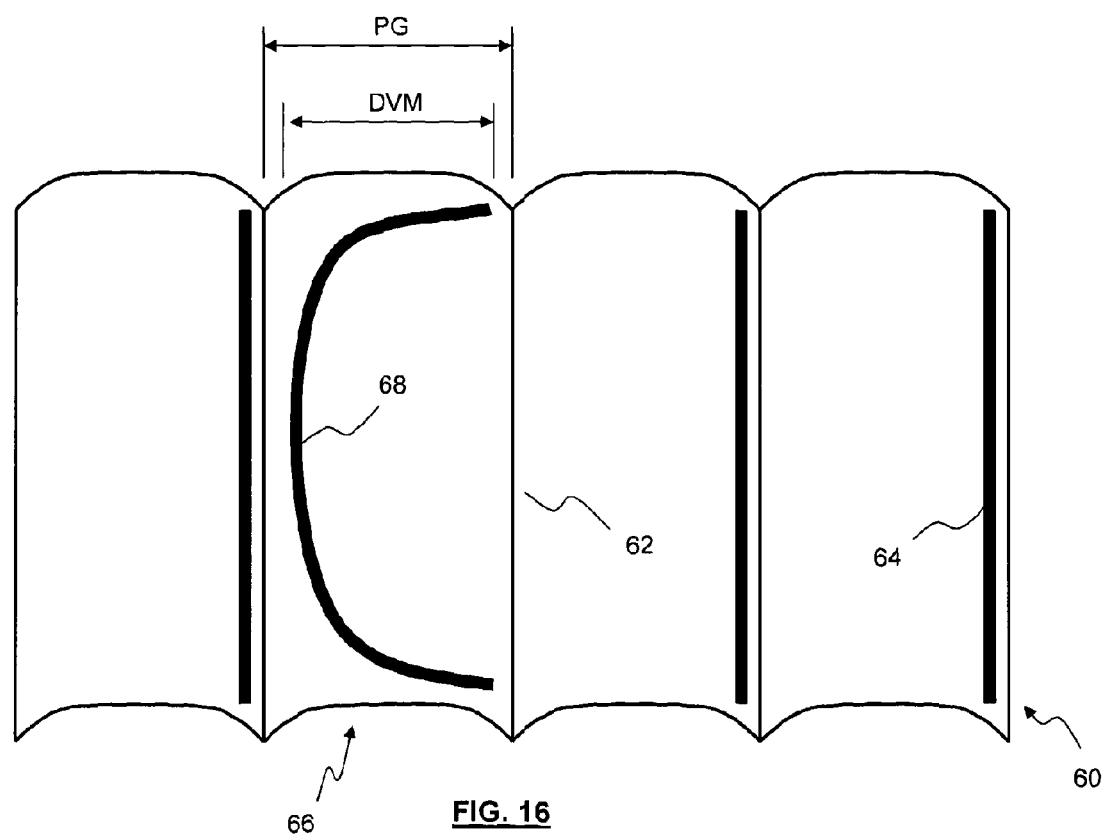
Figure 17:
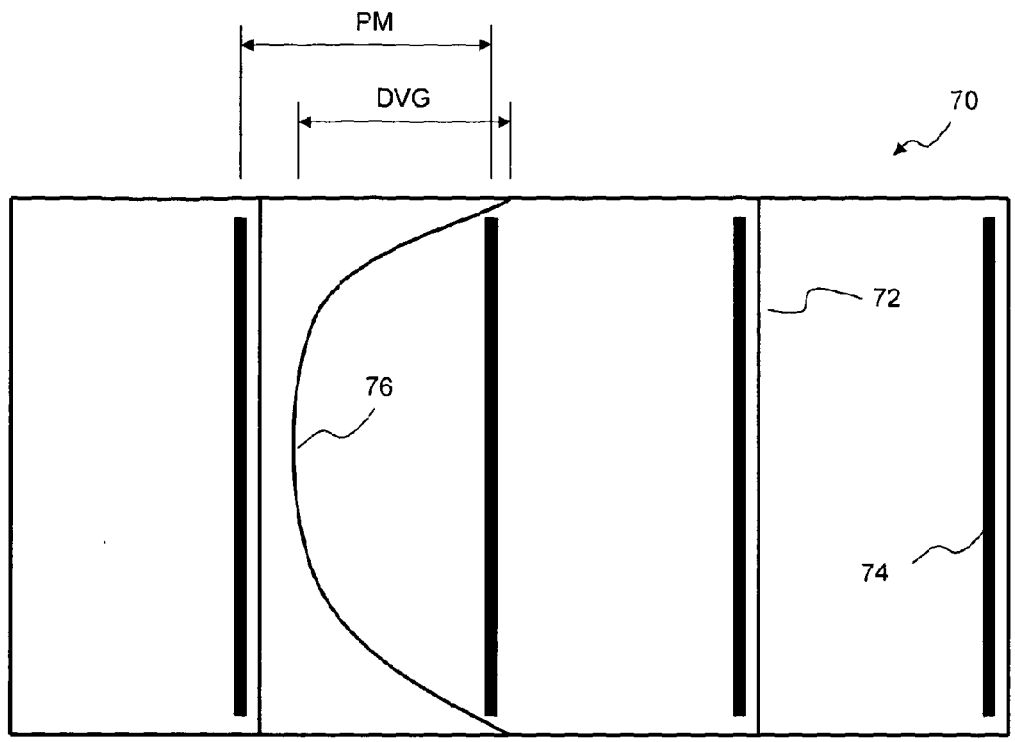
Figure 18:
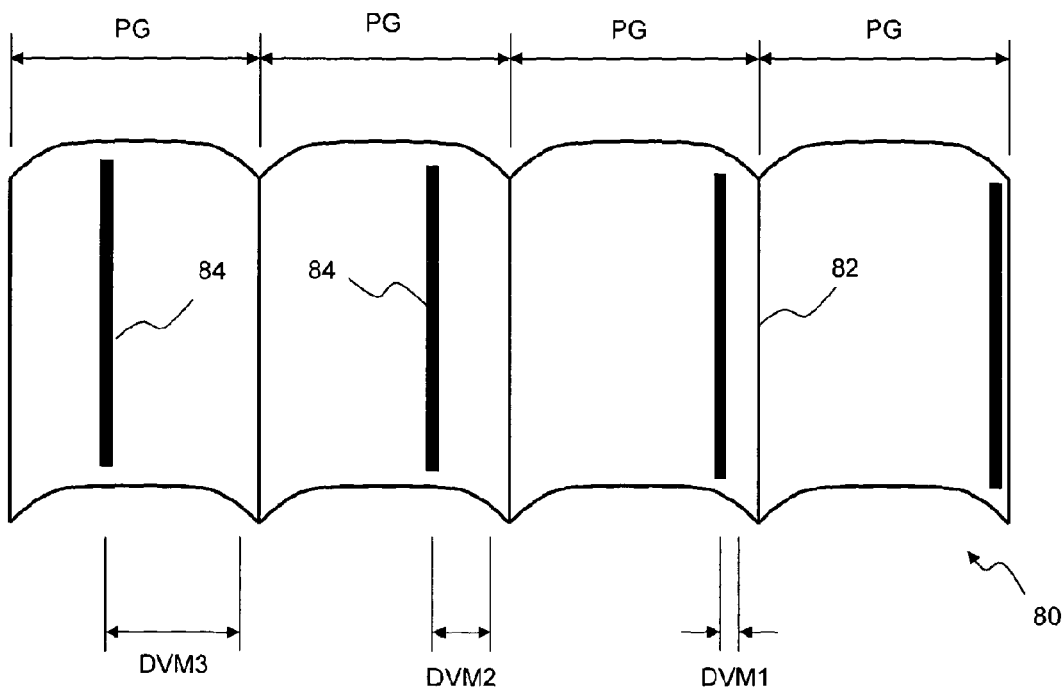
Figure 19:
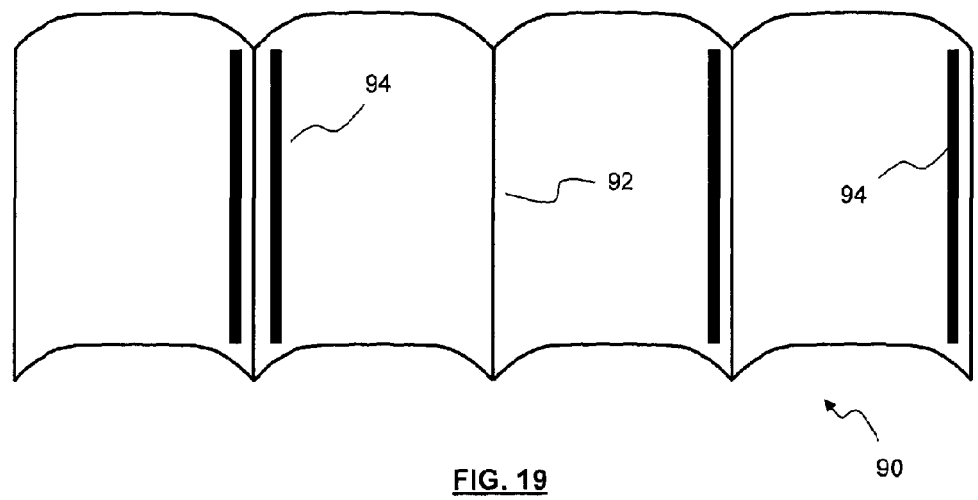
Figure 20:
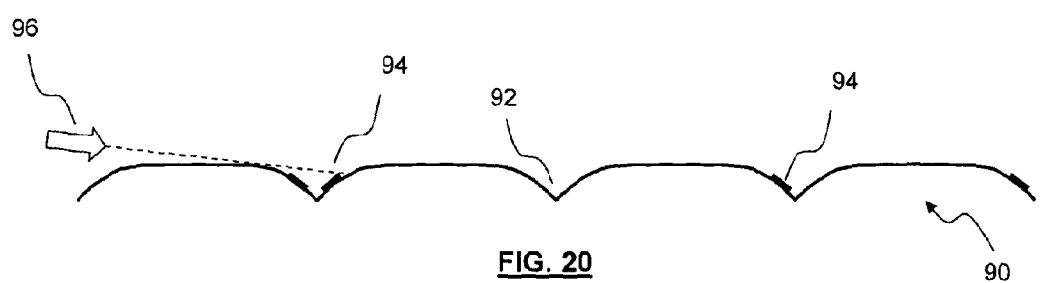
Figure 21:
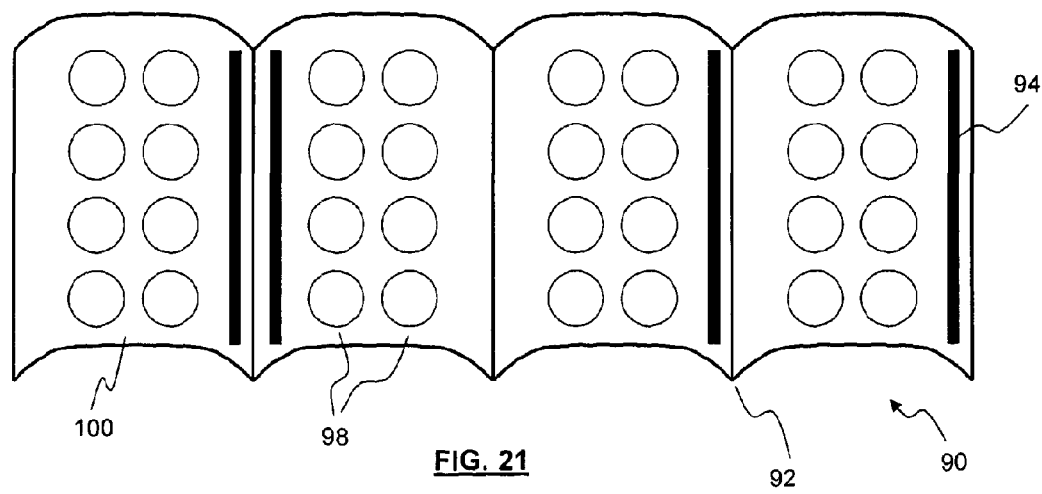

Embodiments of the present invention will now be described, by way of example only, with reference to the following Figures, in which:

FIGS. 1 and 2 depict a known hidden image and optical decoder arrangement;

FIGS. 3 and 4 schematically depict, in side-on and perspective views respectively, an embossed substrate;

FIGS. 5 and 6 schematically depict, in side-on and perspective views respectively, the substrate of FIGS. 3 and 4 with material deposited on that substrate;

FIGS. 7 to 9 schematically depict the substrate of FIGS. 5 and 6 when viewed from different angles;

FIG. 10 schematically depicts a deviation in the location of a line of deposited material on the substrate of FIGS. 3 and 4, a pitch of embossed grooves been constant;

FIG. 11 schematically depicts a deviation in the location of an embossed groove of the substrate shown in FIGS. 3 and 4, a pitch of lines of deposited material being constant;

FIGS. 12 to 14 schematically depict the substrate of FIGS. 10 and/or 11 when viewed from different angles;

FIG. 15 schematically depicts an enlarged view of an embossing or printing deposition pattern as used in existing methods to provide an image only visible, or more readily visible, when a substrate including the lines and/or grooves is viewed from angles away from a perpendicular to the substrate;

FIG. 16 schematically depicts a substrate in accordance with an embodiment of the present invention, wherein a deviation in the location of deposited material is less than a uniform pitch of embossed grooves of the substrate;

FIG. 17 schematically depicts a substrate according to another embodiment of the present invention, showing a deviation in the location of an embossed groove being less than a uniform pitch of lines of material deposited on the substrate;

FIG. 18 schematically depicts a substrate according to another embodiment of the present invention, wherein a deviation of the location of deposited material varies across the substrate;

FIG. 19 schematically depicts a substrate according to another embodiment of the present invention, wherein the deposited material is located substantially on a curved region of the substrate within, or in the vicinity of, one or more embossed grooves of the substrate;

FIG. 20 schematically depicts a side-on view of the substrate of FIG. 19, together with a viewing angle at which material located within the embossed grooves of the substrate is not visible; and FIG. 21 schematically depicts another embodiment of the present invention in which the substrate of FIGS. 19 and 20 is provided with a substantially fixed image on flat regions of the substrate located in-between grooves of that substrate.

The Figures that are referenced herein are not drawn to any particular scale, unless explicitly stated otherwise. Furthermore, the same features appearing in different Figures have been given the same reference numerals, for clarity and consistency.

FIGS. 1 and 2 schematically depict a known arrangement for viewing a hidden image provided on a substrate. Referring to FIG. 1, the arrangement comprises a substrate 2. The substrate 2 (and any substrate described herein) may be or comprise paper, card, plastic, metal, or the like. The substrate 2 has been provided with a hidden image (not visible in FIG. 1) and a background to that hidden image (again, not visible in FIG. 1). The hidden image may be provided in the appropriate configuration of material deposited (e.g. printed) onto the substrate. The background may be, or equate to, an absence of a hidden image. The arrangement further comprises a substantially transparent optical decoder 4. The optical decoder 4 is configured to reveal the hidden image provided on the substrate 2 when the optical decoder 4 is overlaid on top of that hidden image.

FIG. 2 schematically depicts the optical decoder 4 when overlaid on top of the substrate 2. The location and configuration (e.g. optical properties) of the optical decoder 4 reveals the hidden image 6 against the background 8. In this embodiment, the background 8 is plain and may be described or interpreted as a region of the substrate 2 where no hidden image has been provided. In other examples, the background could be a picture, or a pattern, or the like, or another hidden image.

The hidden image 6 is shown in FIG. 1 as a strip or line. It will be appreciated that, in practice, the first hidden image may have a more complex form, and for example be a brand name, a code, a picture, a word, or the like.

As briefly discussed above, the hidden image 6 may be provided by an appropriate configuration of, for example, printed dots or lines on the substrate 2. The dots or lines, or at least a variation in the distribution of the dots or lines, may have a resolution and/or pattern that is not resolvable, or readily resolvable, by the human eye without the presence of the optical decoder 4. When the optical decoder 4 is overlaid on top of the substrate 2 to reveal the hidden image 6, the effect can thus be quite startling and surprising to a viewer of the substrate. The combination of features shown in and described with reference to FIGS. 1 and 2 therefore function well as an anti-counterfeiting mechanism, or as a means of providing an aesthetic effect. However, the use of a separate and independent optical decoder 4 adds to the manufacturing and maintenance costs of the combination. Furthermore, the use of a separate and independent optical decoder 4 may be inconvenient, due to the need to always have the optical decoder 4 at hand to be able to determine if the substrate 2 is provided with a hidden image.

FIGS. 3 to 15 will be used to describe a substrate that may overcome some of the problems associated with the use of the separate, independent optical decoder discussed above, principles of the functionality of the substrate, and problems associated therewith.

FIG. 3 shows a side-on view of a substrate 10 the substrate has been embossed with a plurality of grooves 12, which define relatively curved regions of the substrate 10. Relatively flat regions 14 are defined and located between grooves 12 of the substrate 10. FIG. 4 shows the same substrate 10 in perspective view.

FIG. 5 schematically depicts a side-on view of the same substrate as shown in FIGS. 3 and 4. Lines of material 16 have now been deposited (e.g. by printing) adjacent to and extending alongside the grooves 12. FIG. 6 shows the substrate of FIG. 5 in perspective view. In another embodiment, the deposition of material may be undertaken prior to embossing.

Referring back to FIG. 5, three different viewing angles are shown: perpendicular to the substrate 18; away from perpendicular, at a first a angle 20; and away from perpendicular, at a second angle 22, substantially opposite to the first angle. FIGS. 7 to 9 schematically depict the substrate 10 (or at least a portion thereof) when viewed from the three different viewing angles shown in FIG. 5.

In FIG. 7, the substrate 10 is viewed substantially perpendicularly. The grooves and the deposited material have been provided with a pitch that is substantially not perceivable by a viewer of the substrate. Thus, when the substrate 10 is viewed perpendicularly, the embossed grooves are substantially not perceivable, and neither are the lines of deposited material. Instead, the overall visual effect presented to the viewer is an amalgamation or mixture of the white background provided by the colour of the substrate 10, and the black lines of material deposited thereon. The result is a substantially uniform grey surface presented to the viewer.

When the substrate is tilted, or the viewer of the substrate moves, to change the viewing angle, the viewing experience of the viewer changes dramatically. FIG. 8 shows the substrate when viewed from the first angle 20, away from perpendicular shown in FIG. 5. In combination with FIG. 5, it can been seen that when the substrate 10 is viewed from this angle, little or no deposited material 16 will be visible to the viewer, due to the deposited material 16 been located within embossed grooves 12 of the substrate 10. Thus, in this instance, the viewer will be presented with a much lighter surface (e.g. a whiter surface) than the grey surface shown in FIG. 7. Conversely, when the substrate 10 is viewed from the second angle 22 as shown in FIG. 5, much more of the deposited material 16 becomes visible. At the same time, far less of the white surface of the substrate 10 on which the deposited material 16 is located is visible. Thus, when the substrate 10 is viewed from the second angle 22, a far darker (e.g. greyer or blacker) surface is present to the viewer, as shown in FIG. 9.

The changes in viewing experience can be described in a number of ways. In a first way, and as described above, depending on the viewing angle more or less of the deposited material is visible to the viewer, thus changing the tone or contrast or colour visible to the viewer. Alternatively or additionally, another way or describing this effect would be to consider the reflectance of light from the substrate, and how the deposited material, together with the viewing angle, changes the degree or nature (e.g. colour) of light that is reflected from the substrate and towards the viewer of the substrate.

The effects shown in and described with reference to FIGS. 5 to 9 may already be used to, in a basic form, constitute a hidden image. For example, on a given substrate, only a region of that substrate may be embossed, and/or provided with material running alongside grooves embossed in that substrate. If the remaining area of that substrate is of a colour or the like that matches the colour of the embossed region when viewed perpendicularly, then the embossed region will be substantially indistinguishable from the non-embossed background when the substrate is viewed perpendicularly. However, when the viewing angle changes away from perpendicular, the embossed region will be more visible, or more readily visible, in accordance with the principles discussed in relation to FIGS. 7 to 9. This embossed region does not need to be a simple square or the like, but could be text, a character, a symbol, an image, a picture, a pattern, or the like. Thus, appropriate embossing and/or deposition of material can be used to provide a hidden image on a substrate.

Alternative and/or more sophisticated approaches to the formation of hidden images using embossing and lines of deposited material may be implemented, and which are variations on the methodology and principles associated with the substrate of FIGS. 5 to 9. Examples of such approaches will be described with reference to FIGS. 10 to 15.

FIG. 10 schematically depicts a perspective view of a portion of a substrate 20. The substrate 20 is provided with a plurality of equally spaced grooves 22 extending substantially parallel to one another. The grooves 22 have a pitch PG. Lines of material 24 are deposited on the substrate 20 (before or after embossing) that extend alongside the grooves 22 in a parallel manner. Many or most of the lines of deposited material 24 have a fixed positional relationship with the embossed grooves 22. For instance, many or most of the lines of deposited material 24 may be deposited such that they have the same pitch PM, and such that the lines of deposited material 24 lie adjacent to a groove 22 and on the same side of each respective groove 22, for a majority of the substrate 20. However, the location of at least one line of deposited material 26 may deviate from the fixed positional relationship that otherwise exists. For instance, this line of material 26 may have a deviation DVM from the fixed relationship which again results in the line of material being deposited adjacent to a groove 22, but now on an opposite side of which a line of material 24 has already been provided. This deviation DVM in the line of deposited material 26 will change the view of substrate presented to a viewer of that substrate, as will be discussed in more detail below. Before discussing this change further, FIG. 11 shows how a deviation of a different form can be used to achieve much the same affect as shown in FIG. 10.

FIG. 11 shows another portion of a substrate 30 on which a plurality of lines of material 32 have been deposited (before or after embossing of the substrate 30). The lines of material 32 are deposited in a uniform manner, the lines of material 32 having an equal pitch PM. The substrate 30 is also provided with embossed grooves 34 (before or after the material 32 has been provided on a substrate 30). The lines of material 32 and embossed grooves 34 are provided in such a way that, for a majority of the substrate (for example) there is a fixed positional relationship between the embossed grooves 34 and the lines of material 32. The fixed relationship may be such that for that majority of the substrate, the embossed grooves 34 lie on the immediate right hand side of adjacent lines of deposited material 32 (as viewed in FIG. 11). This may be achieved, at least in part, by ensuring that the pitch of the lines of material PM matches the pitch of the grooves PG.

For a region of the substrate 30, there is a deviation DVG in the location of an embossed groove 38. This deviation DVG results in a particular line of deposited material 36 being located on the right hand side of a particular embossed groove 38. (as opposed to the left, for the majority of the substrate). This deviation DVG will change the view presented to a viewer of the substrate, in much the same manner as alluded to above in relation to FIG. 10. That change in view will now be described with reference to FIGS. 12 to 14.

FIG. 12 shows the substrate of FIGS. 10 and/or 11 viewed perpendicularly. As described in relation to FIG. 7, the pitch (or deviations therein) of the embossed grooves and/or deposited material is such that individual grooves and/or lines of deposited material are not readily perceivable by the viewer of the substrate. Thus, the resultant view presented to a viewer of the portion of the substrate 20, 30 when viewed perpendicularly is an amalgamation or mixture of the black lines of deposited material and the white colour of the substrate, i.e. a substantially grey surface.

FIG. 13 shows the portion of the substrate 20, 30 when viewed from a first angle away from the perpendicular. From this first angle, much (if not all) of each of the lines of the deposited material are not visible. The exception is the line of material that now faces the viewer, by virtue of the deviations discussed above in relation to FIGS. 10 and 11. The line of material that is visible due to the deviations is shown as line 40.

FIG. 14 shows the portion of the substrate 20, 30 when viewed from substantially the opposite angle to the perpendicular. At this angle, the lines of deposited material are far more visible to the viewer, presenting a dark background against which the line 40 is now visible. The line 40 is lighter when viewed at this angle because the line 40 is defined by the absence of a line of deposited material, that line of deposited material being located at a position on the substrate not visible at this angle.

Referring to FIGS. 13 and 14 in combination, it can bee seen that when the portion of the substrate 20, 30 is viewed at different angles, contrast inversion, or substantial contrast inversion has taken place, as viewed by a viewer of the substrate. This contrast inversion highlights the presence of the line 40, which is not visible when the portion of the substrate 20, 30 is viewed perpendicularly. Thus, in this instance the line 40 may be a hidden image. Although the hidden image is shown as a line 40, it will be appreciated that, using the same or substantially the same techniques, the hidden image could be something far more complicated, for example being a picture or a pattern or the like.

FIGS. 10 and 11 have shown something of a simplistic implementation of how deviation in lines of deposited material, or embossed grooves, can have an effect on the viewer of a substrate when that substrate is viewed at different angles (e.g. simplistic in terms of how the deviation is depicted or provided, and the extent of the deviation). FIG. 15 shows how such principles have been proposed as being realised in practice.

FIG. 15 shows a substrate on which a plurality of grooves 52, 54 have been embossed. Grooves 52 of uniform pitch PG define a background region, and deviating grooves 54 define an image region. Although not visible in the Figure, a plurality of lines of material have been deposited on the substrate 50. The lines have a uniform pitch matching that pitch of the background grooves 52, in much the same way as described in relation to FIG. 11 above.

In another embodiment, FIG. 15 could represent the principles discussed above in relation to FIG. 10, wherein the lines in FIG. 15 would represent lines of deposited material, and grooves would have a uniform pitch of background lines of deposited material.

Referring back to the specific example, the background region is provided with grooves 52 uniformly distributed with a pitch PG. In a central region of the substrate 50, grooves 54 are provided that deviate from the background grooves 52. The deviation is such that, when viewed from an angle away from perpendicular to the substrate 50, the substrate 50 presents a square 56 (shown in dashed outline) to the viewer. The square 56 is additionally described as the image region, as opposed to forming or being a background region.

However, there is a problem. When viewed from an angle away from perpendicular, the square 56 does not present a neat, uniform, consistent surface to the viewer. Instead, a number of artefacts, and/or fringing effects, are presented to the viewer. The reason for these artefacts and/or fringing effects is related to the degree or extent of deviation DVG of the embossed lines 54 used to form the square 56. In particular, the extent of the deviation DVG of the grooves 54 used to form the square 56 is, for the majority of the square 56, greater than the pitch PG of the grooves 52 of the background. This can cause or promote clashing between grooves, thus creating artefacts, and/or create the fringing effect. Furthermore, the lines of deposited material (not shown in the Figure) will run adjacent to and alongside the grooves 52 of the background, and will run in this parallel manner across the deviating grooves 54 of the square 56. Thus, in the image region in which the square 56 is located, the lines of material will thus clash with those grooves 54. This also contributes to the formation of artefacts and/or fringing effects.

Thus, although FIG. 15 depicts a practical and realisable implementation of the different viewing effect principles of FIGS. 10 to 14, the resultant image presented to the viewer at viewing angles away from perpendicular is not satisfactory.

According to an embodiment of the present invention, one or more problems discussed above may be overcome. The problems may be overcome by a more careful consideration and implementation of a deviation of the lines of deposited material in relation to embossed grooves, or, conversely, the deviation in the embossed grooves relative to the lines of deposited material.

According to the embodiment, of the present invention, a substrate is provided. The substrate comprises a plurality of embossed grooves extending in a substantially parallel manner, there being a pitch for the spacing between the embossed grooves. A plurality of lines of deposited material is also provided, and in the vicinity of the embossed grooves. 'In the vicinity of' the embossed grooves means a region of the substrate that has been affected by the embossing of the grooves, for example within the grooves, or in a region of the substrate that has been curved or the like as a result of the embossing of the grooves. The plurality of lines of deposited material extend in a substantially parallel manner, there being a pitch for the spacing between lines of deposited material. The deposited material has a different colour to the substrate, making the deposited material visible against the substrate.

In a background region of the substrate to be presented to a viewer of the substrate, there is a fixed positional relationship between the substantially parallel embossed grooves and the substantially parallel lines of deposited material. The fixed relationship is such that the region presents a first background to a viewer of a substrate when viewed from a first angle, and the region presents a second background to viewer of the substrate when viewed from a second angle. The first and second angles are defined as angles on either side of a perpendicular to that substrate, and for example angles subtended across the embossed grooves or deposited lines as opposed to along those lines or grooves (which angle would probably not result in a different view for the viewer). The background may be configured and arranged substantially as shown in and described with reference to FIGS. 5 to 9 above.

An image region of the substrate is also provided which is to be presented to a viewer of the substrate, for example when viewed at angles away from perpendicular. In that image region there are one or more deviations from the fixed positional relationship discussed above. The deviations are such that a first image feature is provided against the first background when viewed from the first angle, and a second image feature is provided against the second background when viewed from a second angle. A subtlety of the present invention lies in the nature of the deviations in the lines of deposited material or in the embossed grooves. In particular, if one or more deviations are in the line or lines of deposited material, each of the one or more deviations is lesser in extent than the pitch of the embossed grooves, and for a majority of that (image) region of the substrate. Conversely, if the one or more deviations are in the embossed groove or grooves, each of the one or more deviations is lesser in extent that the pitch of lines of deposited material, and for a majority of that (image) region.

It has been found that this admittedly subtle feature, possibly in conjunction with additional features, vastly improves upon the visual effect provided by the image feature (e.g. a hidden image feature) when viewed from different angles. One reason for this is that viewing the substrate from different angles will, for a given embossed groove, present or hide a single line of deposited material. This is in contrast with other examples, where viewing of an embossed groove may present numerous lines of material to the viewer at one viewing angle, and numerous (but different) lines of material at another viewing angle. It has been found that the absence or presence of a single line of material (in accordance with the limitation in deviation of the present invention) provides a much greater visual contrast and differential viewing experience than simply reducing the number of numerous lines visible to a viewer to another non-zero number (as in existing proposals).

The fixed positional relationship between the substantially parallel embossed grooves and the substantially parallel lines of deposited material may generally be defined by the substantially parallel embossed grooves being substantially parallel to the substantially parallel lines of deposited material. Alternatively or additionally, the relationship may be defined by the location of the substantially parallel embossed grooves being substantially in phase with the location of the substantially parallel lines of deposited material. The lines and grooves need not be straight, but could be curved, wavy, jagged, or the like.

Further and/or alternative advantages of the present invention will be apparent from the embodiments that will now be described in relation to FIGS. 16 to 21.

FIG. 16 shows a perspective view portion of a of substrate 60 in accordance with an embodiment of the present invention. The substrate 60 is provided with embossed grooves 62 having the above-mentioned fixed positional relationship with lines of deposited material 64. In an image region of the substrate 66 there is a deviation DVM in a line of deposited material 68 from the otherwise fixed positional relationship between other lines of material 64 and the embossed groove 62. Importantly, it can be seen that the deviation DVM never exceeds the pitch between embossed grooves PG. The grooves 64 have an equal, uniform pitch. In non-image regions of the substrate (e.g. a background region), the lines of deposited material 64 are in phase with the grooves 62.

FIG. 17 schematically depicts a different but related embodiment to that shown in FIG. 16. Referring to FIG. 17, a portion of a substrate 70 according to an embodiment of the present invention is shown. The substrate 70 is, again, provided with a plurality of embossed grooves 72 and lines of deposited material 74 having a fixed positional relationship, as discussed above. In contrast to FIG. 16, in the substrate 70 of FIG. 17 the deviation is a deviation DVG in an embossed groove 76 relative to the uniformly deposited lines of material 74. Importantly, the deviation DVG is less than the pitch PM of lines of deposited material 74. The lines of deposited material 74 have an equal, uniform pitch. In non-image regions of the substrate (e.g. a background region), the lines of deposited material 74 are in phase with the grooves 72.

In addition to the restrictions on the extent of deviations discussed above, an additional advantage is realised by ensuring that the deviations do not result in clashing. Specifically, if the deviations are in the line or lines of deposited material, each of the one or more deviations is preferably arranged such that, for a majority of the image region of the substrate, a line of deposited material does not clash with (i.e. come in contact with or cross) an adjacent line of deposited material. Alternatively, if the one or more deviations are in the embossed grooves or groove, each of the one or more deviations is arranged such that, for a majority of the image region of the substrate, an embossed groove does not clash with an adjacent embossed groove. This restriction, also displayed in FIGS. 16 and 17, also limits or avoids the creation of artefacts that might otherwise lead to a degradation of an image feature formed in the image region of a substrate.

While still imposing the above-mentioned restrictions on the extent of any deviations, further variations in the positioning of the embossed grooves or lines of deposited material can be implemented to realise other advantageous features. For instance, FIG. 18 shows another embodiment of a portion of a substrate 80 in accordance with an embodiment of the present invention. For the substrate 80, the embossed grooves 82 have a uniform pitch PG. In contrast, lines of material 84 deposited on the substrate 80 (or at least that portion of the substrate shown in FIG. 18) do not have a uniform pitch, but instead deviate from what would otherwise be a uniform pitch by a deviation DVM1 for a first deviated line of deposited material, DVM2 for a second line of deposited material and DVM3 for a third line of deposited material 84 (DVM1-3 being increasing deviations). When viewed from a set angle away from perpendicular, different amounts of different lines of deposited material will be visible to the viewer (or conversely, the light reflected will be different), due to the different positions of those lines of material 84 relative to the grooves 82 (by virtue of the different deviations). Thus, the viewer may not be presented with an image feature of a single tone, but instead be provided with an image feature that varies in tone in accordance with the variation in deviation. Tonal variation is therefore created, for example grey scaling or the like.

In FIG. 18, deviations in the lines of deposited material have been shown to achieve tonal variation. This same tonal variation can instead be achieved by varying the deviation in the location of embossed grooves. This is because the variation in the deviation of the embossed grooves will also shift the position at which the substrate has a curved structure, which in turn changes the amount of material provided on the substrate that can be viewed at a given angle, or change the light that is reflected therefrom, creating the change in tone.

The variation in extent of the deviations is shown in FIG. 18 as being across the embossed grooves or lines (e.g. the variation changes for different grooves or different lines). However, in another embodiment the deviation could alternatively or additionally vary in extent along an embossed groove, or along a line of deposited material, for example as somewhat coincidentally shown in FIGS. 16 and 17.

FIG. 19 shows a perspective view of another portion of a substrate 90 in accordance with an embodiment of the present invention. The substrate 90 is provided with a plurality of embossed grooves 92 and a plurality of lines of deposited material 94, provided in accordance with one or more of the deviation restrictions discussed above. In this particular embodiment, however, the lines of deposited material 94 are located within one or more embossed grooves 94. The lines of material 94 that are located in the embossed grooves 92 may form at least a part of (e.g. a portion of) the image region discussed above.

FIG. 20 shows the substrate 90 of FIG. 19 in an end-on view. The Figure shows that at a certain viewing angle depicted by arrow 96, the deposited material 94 is not visible to the viewer. Thus, at this viewing angle 96, or at a lower viewing angle (i.e. at a shallower angle to the substrate 90), at least a portion of the image feature, or a composite image formed by a plurality of such image features, will be hidden from view.

In one embodiment the image region may comprise a form of authentication symbol or the like, and this symbol (or a part thereof) will disappear from view when viewed at or below a certain viewing angle as for example shown in FIG. 20. This may provide a useful security feature, or a supplementary security feature. In a further embodiment, different parts of the symbol or the like may be appropriately positioned to disappear from view at different viewing angles (e.g. in a gradual or step-wise manner) to provide an even more sophisticated authentication scheme. This may be achieved at least in part by varying the extent in deviations or the like, as discussed in relation to FIG. 18 above.

FIG. 21 shows substantially the same substrate 90 as shown in and described with reference to FIGS. 19 and 20. In contrast with the substrate shown in FIGS. 19 and 20, the substrate 90 of FIG. 21 has been further provided with further deposited material 98. The further deposited material 98 has been provided on one or more relatively flat regions 100 of the substrate 90 located between the adjacent grooves 92. The further deposited material 98 may for example constitute a fixed image. The image may be described as fixed because it is substantially visible regardless of the viewing angle, mainly due to being located on the flat regions 100 of the substrate 90. In this context, the image feature provided by the lines of deposited material 94 will or may be described as constituting a variable image feature. The image feature is variable because the visibility of the image varies with viewing angle, at least more substantially than the fixed image described previously.

The variable image feature will or may be substantially hidden (e.g. embedded) within the fixed image when the substrate as a whole is viewed substantially perpendicularly. This allows the variable image feature to be used as a security or authentication feature, since the feature may not be visible from a perpendicular viewpoint, and thus not detectable using photocopying or scanning or the like, but clearly visible or absent, and thus identifiable, when the substrate is tilted and viewed from different angles. The further deposited material may have a different colour to the deposited material that forms the lines of material of the hidden image feature, and/or the substrate. This allows different visual effects to be provided using these different colours.

In the embodiments discussed above, different backgrounds will be presented to the viewer depending on the viewing angle of the viewer of the substrate. The first background and the second background (or in other words a background viewed from different viewing angles) referred to above will not necessarily be different images or the like, but are more likely to be different by presenting one or more of a different colour, a different tone, and/or a different contrast (e.g. by virtue of the contrast inversion referred to above). Similarly, a first image feature and/or a second image feature (or in other words an image feature viewed from different viewing angles) may be visible against the first background and/or the second background (or in other words a background viewed from different viewing angles) by presenting one or more of a different colour to that background, a different tone to that background, or a different contrast to that background (e.g. by virtue of the contrast inversion discussed above).

In all of the embodiments and examples given above, a simplistic representation and example of deviations has been provided. Far more complex examples may be used in practice. For instance, a plurality of deviations may be present to form a plurality of image features, the location and/or extent of the deviations being arranged such that the combination of the image features result in or form a composite image. The composite image can be anything, for example being one or more of, or a combination of a character, a symbol, a number, a letter, a pattern and/or a picture.

In the above embodiments, the deposited material has been shown as a continuous line, and the embossed groove as a continuous groove. In other embodiments, the lines may be formed from, respectively, discrete deposits of material (e.g. dots or dashes or the like) or a broken line of discrete grooves (e.g. dots or dashes or the like). In practice, it envisaged that that the use of continuous lines and/or grooves may be preferred to limit or avoid the creation of artefacts and fringing or the like. For instance, a deviation may be a deviation in a continuous line or groove, as opposed to an offset in dots or dashes or the like constituting that line or groove.

In the above examples, different colours have been described. The different colours may be visible to the naked eye of a viewer of the substrate under ambient lighting conditions (e.g. no special lighting being required). Conversely, an additional security feature may be obtained by ensuring that a difference in colour is only apparent when deposited material and/or the substrate is illuminated with light of a particular wavelength, for example ultraviolet radiation.

In numerous above embodiments, it has been made clear that the pitch of the embossed grooves and/or the pitch of lines of deposited material (and/or deviations therein or thereof) is preferably small enough or short enough so as not to be readily perceivable (or perceivable at all) by a naked eye of a viewer of the substrate. The pitch may thus be of the order of one (e.g. line or groove) per millimeter, or less.

In the above embodiments, only lines of a single colour (e.g. black) have been described. In other embodiments, different colours could be used, and lines of different colours may be used on a single substrate (e.g. for a single image region). This can result in a variety of different colours being presented to the viewer of the substrate, the colour changing with viewing angle in accordance with the principles discussed above (e.g. more or less of a certain colour, or combination of colours, being visible from one or more viewing angles). This can add to the aesthetic effect of the substrate as a whole.

In one embodiment, the material is provided on the substrate before the embossing. In another embodiment, the material is provided after the embossing. Depending on the apparatus used to perform the embossing or material deposition, one of these embodiments may be preferable. For example, it may be easier with some apparatus to align the embossing with previously deposited material. Using other apparatus, the reverse may be true. Material may be provided in any manner, for example by printing or the like.

Embossing should be construed broadly, and should be interpreted as providing relief in the substrate. The embossing can be undertaken by applying positive or negative (i.e. reduced pressure). The embossing can be undertaken on a side of the substrate on which material is provided, or is to be provided, or on an opposite side.

A substrate need not be flat, but can be any object on which embossing can be undertaken. 'Perpendicular' as used herein, might then refer to a perpendicular to the point on the substrate being viewed by the viewer. The substrate may be a sheet, a film, a foil, or the like, or a surface of a body of an object. The substrate can be formed from any suitable material, such as for example plastic, paper, card, metal or the like.

It will be appreciated that the above embodiments has been provided by way of example only, and that various modifications can be made to these embodiments, and indeed embodiments not described herein, without departing from the scope of the invention that is defined by the claims that follow.

The invention claimed is:

1. A substrate comprising:
   a plurality of embossed grooves extending in a substantially parallel manner, there being a pitch for the spacing between the embossed grooves;
   a plurality of lines of deposited material provided in the vicinity of the embossed grooves, and extending in a substantially parallel manner, there being a pitch for the spacing between lines of deposited material,
   the deposited material having a different colour to the substrate;
   in a background region of the substrate to be presented to a viewer of the substrate, there being a fixed positional relationship between the substantially parallel embossed grooves and the substantially parallel lines of deposited material, such that the region presents a first background to a viewer of the substrate when viewed from a first angle, and such that the region presents a second background to a viewer of the substrate when viewed from a second angle, the first and second angles being defined as angles on either side of a perpendicular to that substrate
   and
   in an image region of the substrate to be presented to a viewer of the substrate, there being one or more deviations from the fixed positional relationship to provide a first image feature against the first background when viewed from the first angle, and a second image feature against the second background when viewed from the second angle,
   and wherein,
   if the one or more deviations are in the line or lines of deposited material, each of the one or more deviations is lesser in extent than the pitch of the embossed grooves, and for a majority of that region of the substrate;
   or
   if the one or more deviations are in the embossed groove or grooves, each of the one or more deviations is lesser in extent than the pitch of lines of deposited material for a majority of that region.

2. The substrate of claim 1, wherein the fixed positional relationship between the substantially parallel embossed grooves and the substantially parallel lines of deposited material is defined by the substantially parallel embossed grooves being substantially parallel to the substantially parallel lines of deposited material, and/or the location of the substantially parallel embossed grooves being substantially in phase with the location of the substantially parallel lines of deposited material.

3. The substrate of claim 1, wherein if the one or more deviations are in the line or lines of deposited material, each of the one or more deviations is arranged such that, for a majority of the image region of the substrate, a line of deposited material does not clash with an adjacent line of deposited material.

4. The substrate of claim 1, wherein if the one or more deviations are in the embossed groove or grooves, each of the one or more deviations is arranged such that, for a majority of the image region of the substrate, an embossed groove does not clash with an adjacent embossed groove.

5. The substrate of claim 1, wherein the deviation varies in extent across the image region to provide a variation in tone for the image feature, or one or more image features, the deviation varying in extent along one or more embossed grooves or along one or more lines of deposited material, and/or between one or more embossed grooves or between one or more lines of deposited material.

6. The substrate of claim 1, wherein a portion of the deposited material in the image region is located within one or more embossed grooves, such that at least a portion of the image feature, or a composite image formed from a plurality of such image features, is hidden from view when viewed from one or more shallow angles.

7. The substrate of claim 1, wherein further deposited material is provided on one or more relatively flat regions of the substrate located between adjacent grooves, the further deposited material across a plurality of such flat regions constituting a fixed image, that is substantially visible regardless of the viewing angle due to being located on those flat regions, the image feature constituting a variable image feature, the visibility of which varies with viewing angle, at least more substantially than the fixed image.

8. The substrate of claim 7, wherein the variable image feature is substantially hidden within the fixed image, when viewed substantially perpendicularly with respect to the substrate.

9. The substrate of claim 7, wherein the further deposited material has a different colour to: the deposited material, and/or the substrate.

10. The substrate of claim 1, wherein at least a portion of the deposited material is located on a curved region of the substrate within, or in the vicinity of, one or more embossed grooves.

11. The substrate of claim 1, wherein the first background and the second background are different with respect to one another by presenting one or more of:
   a different colour;
   a different tone; and/or
   a different contrast, and/or wherein the first image feature and/or second image feature is visible against the first background and/or second background, respectively, by presenting one or more of:
a different colour;
a different tone; and/or
a different contrast.

12. The substrate of claim 1, wherein a plurality of deviations are present to form a plurality of image features, the location and/or extent of the deviations being arranged such that the combination of the image features results in a composite image, the composite image optionally being one or more of, or a combination of: a character, a symbol, a number, a letter, a pattern and/or a picture.

13. The substrate of claim 1, wherein the line of deposited material is a continuous line, or a broken line of discrete deposits, and/or wherein the embossed groove is a continuous groove, or a broken line of discrete grooves.

14. The substrate of claim 1, wherein the deposited material, and/or the further deposited material, and/or the substrate are different in colour when viewed by a naked eye under ambient lighting conditions.

15. The substrate of claim 1, wherein the deposited material, and/or the further deposited material, and/or the substrate have a difference in colour that is only visible when the deposited material and/or the substrate is illuminated with light of a particular wavelength.

16. The substrate of claim 15, wherein the light of a particular wavelength is ultraviolet radiation.

17. The substrate of claim 1, wherein the pitch of the embossed grooves, and/or the pitch of lines of deposited material, is low enough for the pitch not to be readily perceivable by a naked eye of a viewer of the substrate.

* * * * *